United States Patent [19]

Reisman et al.

[11] Patent Number: 5,009,360

[45] Date of Patent: Apr. 23, 1991

[54] METAL-TO-METAL BONDING METHOD AND RESULTING STRUCTURE

[75] Inventors: Arnold Reisman, Raleigh, N.C.; Deepak Nayak, Los Angeles, Calif.; Iwona Turlik, Raleigh, N.C.

[73] Assignee: MCNC, Research Triangle Park, N.C.

[21] Appl. No.: 486,064

[22] Filed: Feb. 27, 1990

Related U.S. Application Data

[63] Continuation of Ser. No. 277,620, Nov. 29, 1988, abandoned.

[51] Int. Cl.$^5$ .................. B23K 31/00; B23K 103/14
[52] U.S. Cl. ............................ 228/198; 228/194; 228/219; 228/211; 228/263.21
[58] Field of Search ............. 228/193, 194, 195, 198, 228/203, 219, 263.17, 263.21, 211; 75/10.43

[56] References Cited

U.S. PATENT DOCUMENTS

| 2,639,555 | 5/1953 | Buttino et al. ............ 65/42 |
| 3,651,562 | 3/1972 | Hambleton . |
| 3,744,120 | 7/1973 | Burgess et al. . |
| 3,871,881 | 3/1975 | Mikelsons ............ 427/132 |
| 3,911,553 | 10/1975 | Burgess et al. . |
| 4,046,305 | 9/1977 | Brown et al. . |
| 4,050,956 | 9/1977 | de Bruin et al. . |
| 4,054,467 | 10/1977 | Mikelson ............ 427/180 |
| 4,200,474 | 4/1980 | Morris . |
| 4,245,768 | 1/1981 | Sater . |
| 4,288,470 | 9/1981 | Bate et al. . |
| 4,411,962 | 10/1983 | Johnson . |
| 4,495,219 | 1/1985 | Kato et al. . |
| 4,693,409 | 9/1987 | Mizunoya et al. . |
| 4,704,512 | 11/1987 | Lisec . |
| 4,732,312 | 3/1988 | Kennedy et al. . |

FOREIGN PATENT DOCUMENTS

| 0117671 | 2/1984 | European Pat. Off. . |
| 0201123 | 4/1986 | European Pat. Off. . |
| 52-27045 | 3/1977 | Japan . |
| 223682 | 10/1985 | Japan . |
| 900804 | 7/1962 | United Kingdom . |

OTHER PUBLICATIONS

W. P. Mazara, G. Goetz, A. Caviglia and J. B. McKittrick, "Bonding of Silicon Wafers for Silicon-On Insulator," for Bendix Aerospace Technology Center, Undated.

Metals Handbook, Ninth Edition, vol. 13 Corrosion, ASM International Handbook Committee, 1987, pp. 65-76 and 80-81.

*Primary Examiner*—Sam Heinrich
*Attorney, Agent, or Firm*—Bell, Seltzer, Park & Gibson

[57] ABSTRACT

A method and resulting structure is disclosed in which a metal-to-metal bond is formed by heating the surfaces to be bonded in an oxidizing ambient atmosphere until the desired bond is achieved. Heating takes place at 700° C.–1200° C. and bonding may be enhanced by applying pressure between the surfaces while heating.

11 Claims, 2 Drawing Sheets

METAL-TO-METAL BONDING METHOD AND RESULTING STRUCTURE

This application is a continuation of application Ser. No. 07/277,620, filed Nov. 29, 1988, now abandoned.

FIELD OF THE INVENTION

This invention relates to bonding of surfaces and more specifically to the bonding of metal surfaces.

BACKGROUND OF THE INVENTION

Many techniques are known for bonding metal surfaces. For example, soldering, brazing and welding are commonly used. These methods employ a variety of temperatures, bonding materials and bonding conditions. Notwithstanding this variety, there is a continuing need for improved metal-to-metal bonding techniques.

A common problem faced by existing techniques is the removal of residual oxide coatings on the surfaces to be bonded. Numerous patents teach that a stronger bond is obtained when the metal surfaces to be bonded are free of oxides. For example, U.S. Pat. No. 4,732,312 to Kennedy, et al. teaches the removal of surface oxides when diffusion bonding. U.S. Pat. No. 4,704,512 to Lisec teaches removal of oxides when welding, and U.S. Pat. No. 4,245,768 to Sater removes surface oxides when welding metals using ion beam technology.

SUMMARY OF THE INVENTION

In accordance with the foregoing, it is therefore an object of the present invention to provide an improved technique for bonding metals.

It is another object of the present invention to provide an improved bonded metal-to-metal structure.

These and other objects of the present invention are accomplished by placing the metal surfaces to be bonded in contact and heating in an oxidizing atmosphere to thereby form an oxide bond between the metals. In one embodiment a surface oxide is formed on each surface to be bonded, before bringing the surfaces into contact and heating. In either case, according to the invention, oxide is used to form a high quality bond between surfaces, in contrast with the prior art, which regarded oxide as an undesirable impurity which must be removed to create a high quality bond.

DETAILED DESCRIPTION OF THE INVENTION

The present invention now will be described more fully hereinafter with reference to the accompanying drawings, in which preferred embodiments of the invention are shown. This invention can, however, be embodied in many different forms and should not be construed as limited to the embodiments set forth herein; rather, applicants provide these embodiments so that this disclosure will be thorough and complete, and will fully convey the scope of the invention to those skilled in the art.

Like characters refer to like elements throughout.

Figure 1A:
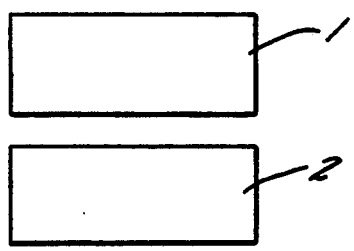
FIGS. 1a-1c are cross sectional views illustrating a metal to metal bonding method according to the invention.
Figure 1B:
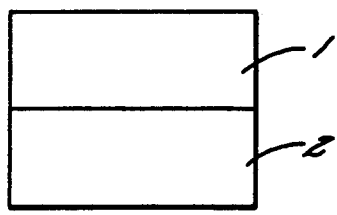
Figure 1C:
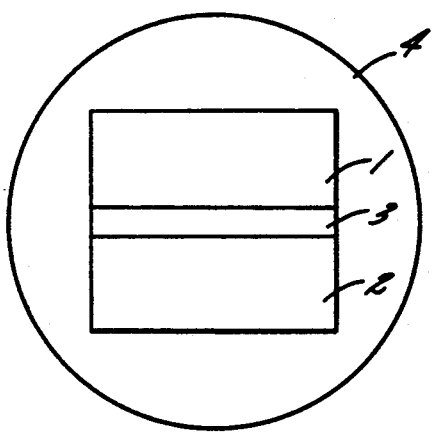

Referring now to FIG. 1a, two metal surfaces 1 and 2, to be bonded are shown. In FIG. 1b, the two metal surfaces to be bonded are placed in physical contact, and are pressed together. In FIG. 1c, the metal surfaces 1 and 2 are placed in furnace 4 containing an oxidizing ambient and heated, to form a thin oxide bond layer 3 therebetween.

Figure 2A:
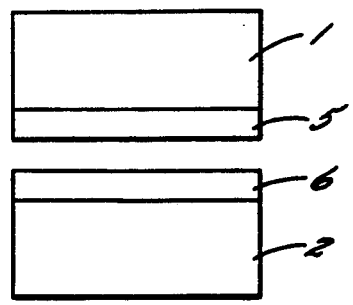
FIGS. 2a-2c are cross sectional views illustrating an alternative metal to metal bonding method according to the invention.
Figure 2B:
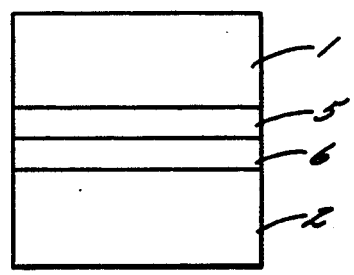
Figure 2C:
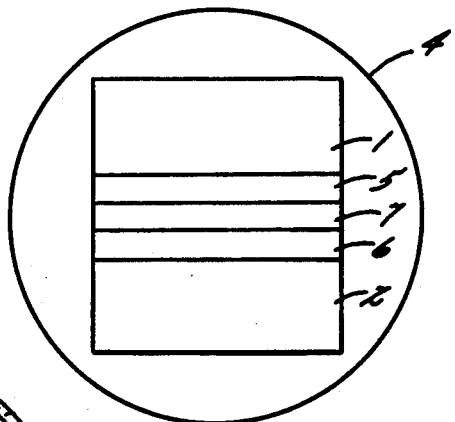

Referring to FIG. 2, an alternative method of bonding metal surfaces by first forming an oxide on one or both surfaces to be bonded is shown. In FIG. 2a, oxide layers 5 and 6 are formed on the respective metal surfaces 1 and 2 to be bonded. In FIG. 2b, the oxide surfaces 5 and 6 are pressed together and then heated in a furnace 4 containing an oxidizing ambient atmosphere to bond the surfaces (FIG. 2c). In FIG. 2c an intermediate oxide bond layer 7 is shown between oxide layers 5 and 6. It will be understood by those having skill in the art that oxide layers 5, 6 and 7 form a single oxide layer which bonds the metal surfaces 1 and 2.

Figure 3:
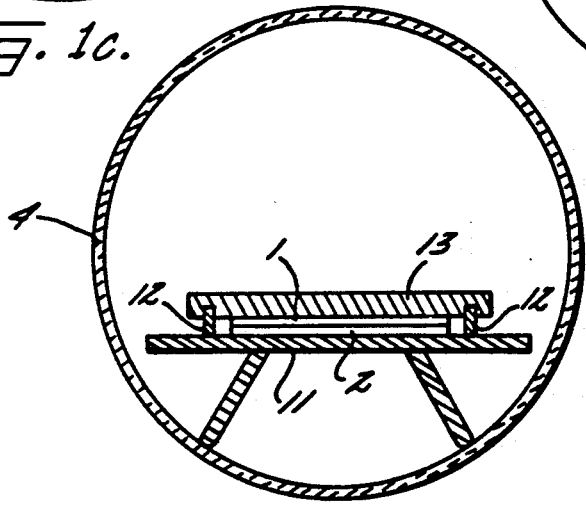
FIG. 3 illustrates a cross section of a quartz carrier which may be used during the bonding process of FIGS. 1 or 2.

Referring now to FIG. 3, a quartz carrier 11, may be employed to hold a pair of flat surfaces to be bonded 1 and 2, in the furnace. To improve physical contact between surfaces, a quartz plate 13 may be placed on top of the pair of surfaces to act as a uniformly distributed weight source. The plate 13 preferably weighs several hundred grams. Pegs 12 may be employed to hold plate 13 in place. The quartz plate maintains the surfaces in intimate contact during insertion into the furnace, and during the bonding process, and provides for more consistent bonding.

According to the invention, bonding may take place in a standard annealing furnace or a rapid thermal annealing chamber, both of which are well known to those having skill in the art and will not be described in detail. Preferably, the bonding time for the standard furnace at the annealing temperature is at least 20 minutes, while in a rapid thermal annealing furnace, times between 2–4 minutes may be employed. An ambient atmosphere of dry oxygen and water vapor may be employed, with the amount of oxygen and water vapor not being critical as long as oxides are formed. In addition, HCl gas present to the extent of several percent by volume may also be present in the ambient atmosphere. Nitrogen, argon or other unreactive gases may also be employed with oxygen and water. The bonding temperature may vary from about 600° C. to about 1150° C.

Figure 4A:
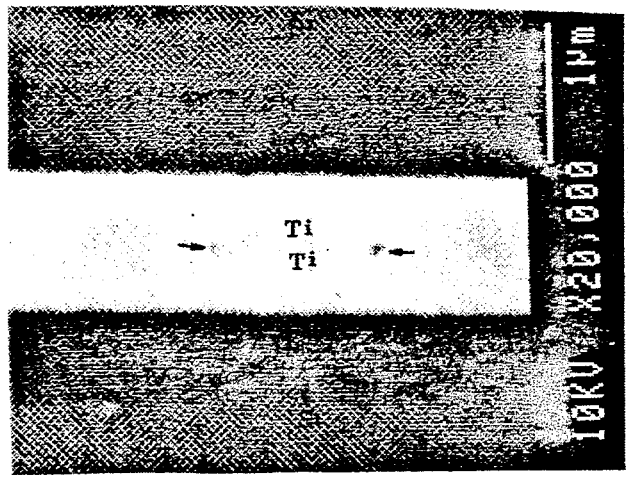
FIGS. 4a-4c are photographs of metal to metal bonded structures according to the present invention.
Figure 4B:
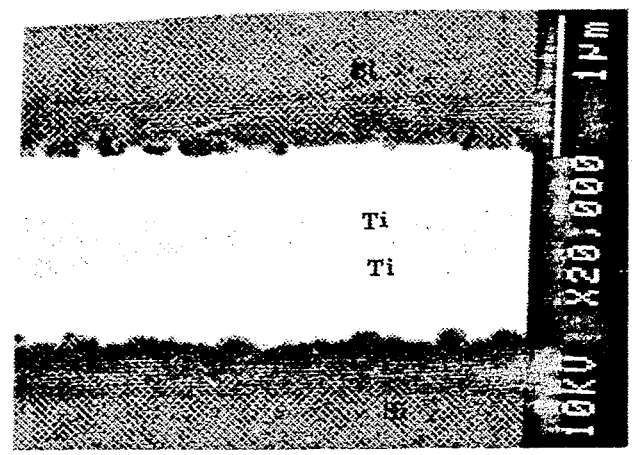
Figure 4C:
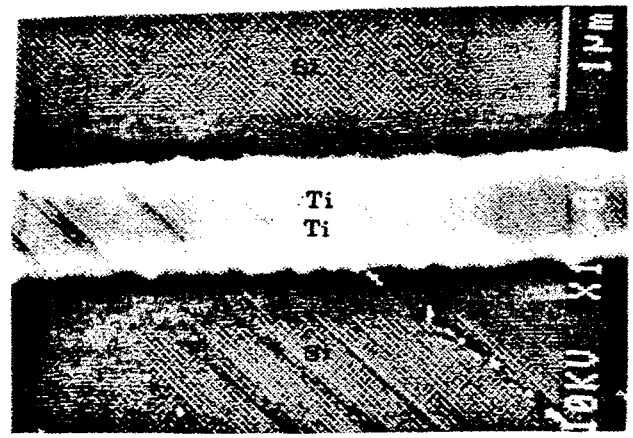

For example, it has been found that titanium (Ti) to Ti bonded very well in oxidizing atmospheres at temperatures greater than or near 700° C. in a conventional furnace for twenty minutes. The electron microscopic pictures of the bonded samples are shown in FIG. 4a, b, and c. No irregularities at the bonded seams, x, y, z were noticed for bonding temperatures greater than or near 900° C. At 700° C., however, bond formation was almost complete.

Good bonding between Ti and Ti was found to occur in an oxidizing ambient atmosphere. While Applicants do not wish to be bound by any particular theory, the chemical bond formation in Ti—Ti structures is believed to result from formation of Ti—O—Ti bonds between two Ti structures. It has been found that these bonds may be formed between two bare metal surfaces which are pressed together as a result of microscopic surface irregularities which allow oxygen to penetrate throughout the interface of the two surfaces. It will be understood by those having skill in the art that this technique of bonding two metallic surfaces via oxidation may be extended to bond other flat and smooth metallic surfaces such as aluminum, or to metal alloys. It will also be understood by those skilled in the art that similar or dissimilar metals or metal alloys may be bonded. It will be further understood by those having skill in the art that this technique of bonding two metallic surfaces via oxidation may be employed by placing the metal surfaces on various substrates before bonding and then continuing by bonding the metal surfaces face to face.

This method of bonding metal surfaces according to the present invention may be employed in semiconductor-on-insulator (SOI) or semiconductor fabrication processes, as disclosed in the application filed concurrently herewith, Ser. No. 07/277,607, entitled "High Density Semiconductor Structure and Method of Making the Same,". The disclosure of this co-pending application is expressly incorporated by reference.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method for bonding flat metal surfaces comprising the steps of:
    placing said flat metal surfaces in contact with one another; and
    forming an oxide bond between said flat metal surfaces in contact with one another by heating said flat metal surfaces in an oxidizing ambient atmosphere to a temperature substantially below the melting point of said flat metal surfaces and below the eutectic melting point of said metal and said oxide, said oxide itself bonding said flat metal surfaces to one another through the formation of chemical bonds between oxygen from the oxidizing ambient atmosphere and metal from each of the flat metal surfaces, as the oxide is formed.

2. The method of claim 1 further comprising the step of applying sufficient pressure between said flat metal surfaces to maintain said flat metal surfaces in intimate contact with one another during said oxide bond forming step.

3. The method of claim 1 wherein said placing step is preceded by the step of forming a surface oxide layer on at least one of said flat metal surfaces.

4. The method of claim 1 wherein said heating step comprises the step of heating said flat metal surfaces to a temperature between 600° C. and 1150° C.

5. The method of claim 1 wherein said oxidizing ambient atmosphere consists of oxygen and water vapor.

6. The method of claim 1 wherein said oxidizing ambient atmosphere consists of oxygen, water vapor and hydrochloric acid.

7. The method of claim 1 wherein said oxidizing ambient atmosphere consists essentially of oxygen and water vapor.

8. The method of claim 1 wherein said oxidizing ambient atmosphere consists essentially of oxygen, water vapor and hydrochloric acid.

9. The method of claim 1 wherein said flat metal surfaces are titanium.

10. The method of claim 9 wherein said heating step comprises the step of heating said flat titanium surfaces to a temperature between 700° C. and 900° C.

11. The method of claim 10 wherein said heating step further comprises the step of heating said flat titanium surfaces for twenty minutes.

* * * * *